US010318455B2

(12) United States Patent
Chalfant et al.

(10) Patent No.: US 10,318,455 B2
(45) Date of Patent: Jun. 11, 2019

(54) SYSTEM AND METHOD TO CORRELATE CORRECTED MACHINE CHECK ERROR STORM EVENTS TO SPECIFIC MACHINE CHECK BANKS

(71) Applicant: DELL PRODUCTS, LP, Round Rock, TX (US)

(72) Inventors: David K. Chalfant, Round Rock, TX (US); Tuyet-Huong Nguyen, Cedar Park, TX (US); Jose M. Grande, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/654,411

(22) Filed: Jul. 19, 2017

(65) Prior Publication Data
US 2019/0026239 A1    Jan. 24, 2019

(51) Int. Cl.
| | | |
|---|---|---|
| *G06F 13/24* | (2006.01) | |
| *G06F 9/54* | (2006.01) | |
| *G06F 11/34* | (2006.01) | |
| G06F 9/48 | (2006.01) | |
| G06F 9/38 | (2018.01) | |
| G06F 11/07 | (2006.01) | |

(52) U.S. Cl.
CPC .............. *G06F 13/24* (2013.01); *G06F 9/546* (2013.01); *G06F 11/34* (2013.01); *G06F 9/3855* (2013.01); *G06F 9/4812* (2013.01); *G06F 11/0703* (2013.01)

(58) Field of Classification Search
CPC ........... G06F 13/24; G06F 9/546; G06F 11/34

USPC ........................................................ 710/263
See application file for complete search history.

(56) References Cited

U.S. PATENT DOCUMENTS

| | | | |
|---|---|---|---|
| 7,120,717 B2 | 10/2006 | Vu | |
| 7,199,608 B1* | 4/2007 | Trimberger | ...... H03K 19/17732 |
| | | | 326/38 |
| 9,343,181 B2 | 5/2016 | Suhas et al. | |
| 2003/0074601 A1* | 4/2003 | Schultz | ............... G06F 11/0772 |
| | | | 714/15 |

(Continued)

OTHER PUBLICATIONS

Reliability, Availability and Serviceability (RAS) Integration and Validation Guide for the Intel Xenon Processor E7—v3 Family Error Reporting through EMCA Gen Apr. 2, 2015 (Year: 2015).*

*Primary Examiner* — Paul R. Myers
(74) *Attorney, Agent, or Firm* — Larson Newman, LLP (57) ABSTRACT

An information handling system includes a central processing unit, which in turn includes a system memory and a first processor core. The system memory stores Common Platform Error Record (CPER) entries in a queue. The first processor core stores the hardware error in a bank of a machine check bank register of the first processor core, and generates a system management interrupt (SMI) in response to storing the hardware error in the bank. The central processing unit receives the generated SMI, clears CPER entries within the queue of the system memory that are outside a specific timespan before a corrected machine check error indication associated with the generated SMI is received, adds a CPER entry associated with the corrected machine check error indication to the queue of the system memory, and disables SMI generation from the machine check bank number in response to the number of CPER entries exceeding the threshold count.

20 Claims, 3 Drawing Sheets

(56) References Cited

U.S. PATENT DOCUMENTS

| | | | |
|---|---|---|---|
| 2004/0268189 A1* | 12/2004 | Constantinescu | G06F 11/008 714/704 |
| 2005/0022059 A1* | 1/2005 | Wei | G06F 11/2289 714/36 |
| 2005/0182879 A1* | 8/2005 | Vu | G06F 13/24 710/260 |
| 2005/0246465 A1* | 11/2005 | Wright | G06F 13/24 710/260 |
| 2005/0289402 A1* | 12/2005 | Nerl | G06F 11/1064 714/52 |
| 2006/0129747 A1* | 6/2006 | Weber | G06F 21/78 711/100 |
| 2007/0061634 A1* | 3/2007 | Marisetty | G06F 11/0793 714/48 |
| 2008/0288815 A1* | 11/2008 | Kumar | G06F 11/0769 714/10 |
| 2013/0058210 A1* | 3/2013 | Natarajan | H04L 41/0622 370/228 |
| 2014/0188829 A1* | 7/2014 | Ranganathan | G06F 17/30289 707/705 |
| 2015/0067409 A1* | 3/2015 | Martz | G06F 21/00 714/47.2 |
| 2015/0242747 A1* | 8/2015 | Packes | G06N 3/0454 706/17 |
| 2016/0321127 A1 | 11/2016 | Raj et al. | |

* cited by examiner

SYSTEM AND METHOD TO CORRELATE CORRECTED MACHINE CHECK ERROR STORM EVENTS TO SPECIFIC MACHINE CHECK BANKS

FIELD OF THE DISCLOSURE

The present disclosure generally relates to information handling systems, and more particularly relates to correlating corrected machine check error storm events to specific machine check banks.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a central processing unit, which in turn includes a system memory and a first processor core. The system memory may store Common Platform Error Record (CPER) entries in a queue. The first processor core may store the hardware error in a bank of a machine check bank register of the first processor core, and may generate a system management interrupt (SMI) in response to storing the hardware error in the bank. The central processing unit may receive the generated SMI, may clear CPER entries within the queue of the system memory that are outside a specific timespan before a corrected machine check error indication associated with the generated SMI is received, may add a CPER entry associated with the corrected machine check error indication to the queue of the system memory, and may disable SMI generation from the machine check bank number in response to the number of CPER entries exceeding the threshold count.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
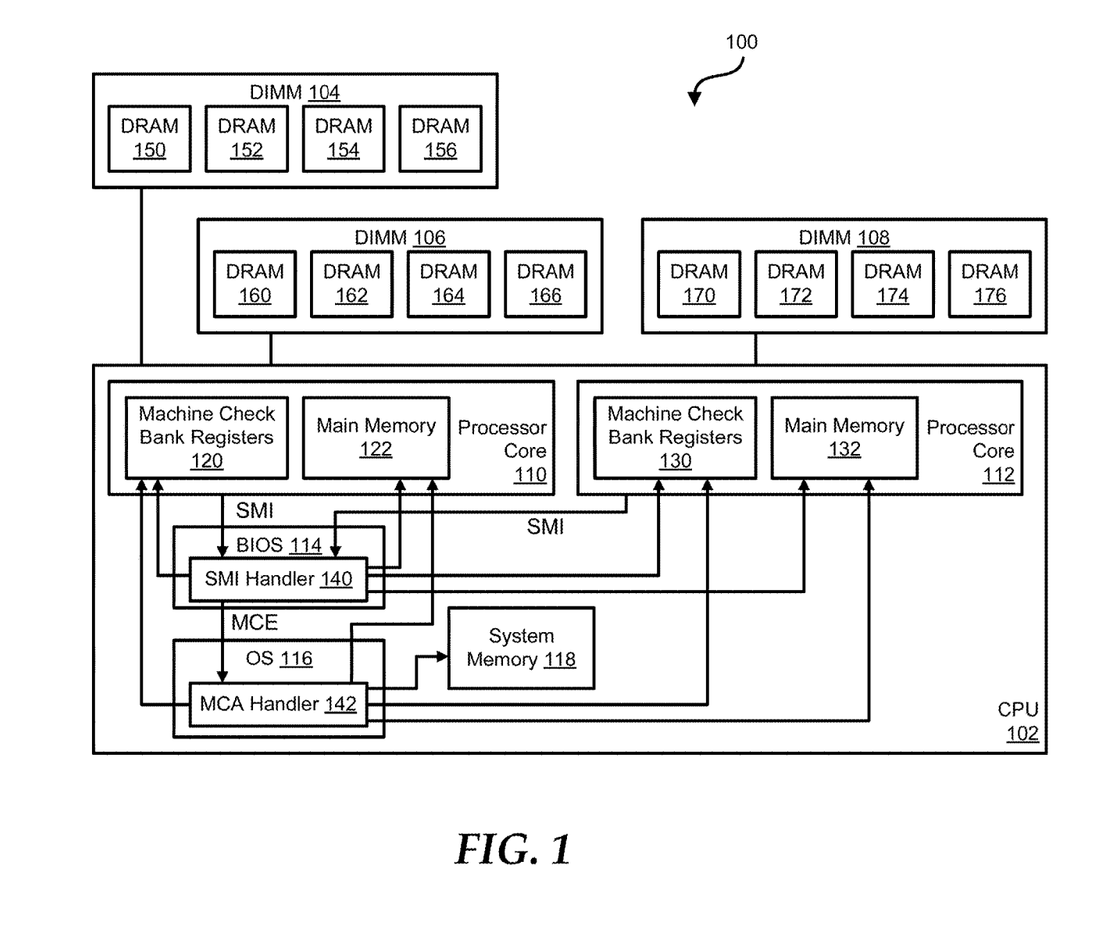
FIG. 1 is block diagram of an information handling system including a central processing unit and multiple dual in-line memory modules according to at least one embodiment of the disclosure.

FIG. 1 shows an information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

The information handling system 100 includes CPU 102, and dual in-line memory modules (DIMMs) 104, 106, and 108. In an embodiment, the information handling system 102 can be a server, a personal computer, a laptop computer, or the like. The CPU 102 includes processor cores 110 and 112, a basic input/output system (BIOS) 114, an operating system (OS) 116, and a system memory 118. The processor core 110 includes machine check bank registers 120 and a main memory 122. The processor core 110 includes machine check bank registers 130 and a main memory 132. The BIOS 114 includes a system management interrupt (SMI) handler 140. In an embodiment, the SMI handler 140 can be a firmware process executed by the CPU 102. The OS 116 includes a machine check architecture (MCA) handler 142. In an embodiment, the MCA handler 142 can be a process in which the CPU 102 reports hardware errors, such as errors in DIMM 104, 106, or 108, to the OS 116. The DIMM 104 includes multiple dynamic random access memories (DRAMs) 150, 152, 154, and 156 (150-156). The DIMM 106 includes multiple DRAMs 160, 162, 164, and 166 (160-166). The DIMM 108 includes multiple DRAMs 170, 172, 174, and 176 (170-176). In an embodiment, DIMMs 104 and 106 can be assigned with processor core 110 and DIMM 108 can be assigned with processor core 112. In another embodiment, DIMMs 104, 106, and 108 can be assigned to, and shared by, both processor core 110 and 112.

In an embodiment, the errors in the DIMMs 104, 106, and 108 can include error correction code (ECC) errors and/or parity errors associated with data stored within the DRAMs 150-156, 160-166, or 170-176. In an embodiment, hardware errors can also include errors in other hardware components, such as system bus errors, cache errors, translation lookaside buffer errors, or the like.

During a Unified Extensible Firmware Interface (UEFI) boot process, the processor cores 110 and 112 can monitor the health of memory subsystems for the information handling system 100, such as the DIMMs 104, 106, and 108, and the detected errors can be classified as either corrected errors or uncorrectable errors. The detected error or errors can then be stored in the machine check bank registers 120 or 130. The information stored for a particular error may include the physical address, such as the DIMM address, of the failing location within DIMM 104, 106, or 108. In an embodiment, the DIMM address can be specified in terms of a DIMM serial number and rank/bank/row/column number inside the DIMM 104, 106, or 108. In an embodiment, the processor cores 110 and 112 can implement Enhanced Machine Check Architecture Generation 2 (eMCA Gen2), which can enable the processor cores 110 and 112 to provide system management interrupts (SMI) to the SMI handler 140 of the BIOS 114 for both corrected and uncorrected errors recorded in the machine check bank registers 120 and 130 on an bank by bank basis, such that the SMI handler 140 can determine, which bank or banks of the machine check bank registers 120 and 130 are generating the SMI provided to the SMI handler 140. In an embodiment, the SMI storm monitoring can also include OS runtime health after the OS has booted, because the SMI handler 140 can be transparent to the OS and the CPU 102 can provide a means to notify the BIOS of memory errors during both the boot process as well as after the OS has been loaded.

In an embodiment, the processor cores 110 and 112 can monitor the DIMMs 104, 106, and 108, record errors in the machine check bank registers 120 and 130, and provide SMI to the SMI handler 140 in substantially the same manner. Therefore, for clarity and brevity, the description operations herein will be made with respect to processor core 110, machine check bank registers 120, and main memory 122. The processor core 110 can detect an error in DIMM 104, and then write the error to a bank of the machine check bank registers 120. After the error is written to a bank within the machine check bank registers 120, the processor core 110 can automatically correct the error to create a corrected machine check event, which in turn can generate a corrected machine check error indication (CMCI). In eMCA2, when a CMCI occurs the BIOS can be notified via a SMI to the SMI handler 140 of the BIOS 114. In an embodiment, the SMI handler 140 can determine that the SMI came from the processor core 110 and can communicate with the machine check bank registers 120 to determine the bank that generated the SMI. The SMI handler 140 can also store an enhanced error log, such as DIMM serial number and rank/bank/row/column number of the DIMM 104 or 106 that has the error, in the main memory 122.

In an embodiment, SMI handler 140 can receive an Advanced Processor Interrupt Controller Identification (APIC ID) and machine check bank number that caused the SMI. For example, the CMCI can include an APIC ID of processor core 110 and machine check bank number 1 to identify that bank number 1 of the machine check bank registers 120 within processor core 110 generated SMI. The SMI handler 140 can store a UEFI Common Platform Error Record (CPER) entry within a queue of the system memory 118 to identify the specific APIC ID and machine check bank number associated with the SMI.

In an embodiment, if DIMM 102 or 104 begins to fail, DIMM 102 or 104 can provide a stream of corrected errors to the processor core 110. The stream of errors can then be stored in a single bank of the machine bank registers 120, such that the same bank can cause the processor core 110 to provide multiple SMI to the SMI handler 140 within a short period of time. The generation of multiple SMI within a period of time can be referred to as a SMI storm. In an embodiment, a SMI storm can cause the CPU 102 to slow down because too much processing time is used processing the SMI storm as described above with respect to the SMI handler 140.

Thus, the BIOS SMI handler 140 can determine a source of a SMI storm and disable the particular bank of the machine check bank registers 120 that is generating the SMI storm as described below. During error processing phase of the UEFI boot process, after the BIOS SMI handler 140 receives a CMCI with an APIC ID and machine check bank number, the BIOS SMI handler 140 can clear the queue within the system memory 118 of all CPER entries that are older than a specific timespan, such as ten seconds prior to the current time. Thus, the BIOS SMI handler 140 can monitor a SMI storm for a particular amount of time based on the timespan, such as a ten second window. The portion of the system memory 118 previously allocated to the cleared CPER entry or entries can then be deallocated for later storage. In an embodiment, the BIOS SMI handler 140 can also perform these operations during OS runtime after an OS boot has been performed. The BIOS SMI handler 140 can monitor SMI storms during OS runtime based on the BIOS SMI handler 140 being transparent to the OS, such that the OS is totally unaware of any SMI handler execution because all OS code execution is suspended while the BIOS SMI handler 140 is running.

The BIOS SMI handler 140 can then add CPER entry for the APIC ID and machine check bank number to the queue of the system memory 118. In an embodiment, the BIOS SMI handler 140 can add the CPER entry by dynamically allocating a required amount of the system memory 118 to the SMI storm queue. The BIOS SMI handler 140 can then determine the number of errors that have occurred on a specific APIC ID and machine check bank number based on the CPER entries for that APIC ID and machine check bank number. If the BIOS SMI handler 140 determines that the number of CPER entries for that APIC ID and machine check bank number exceed a threshold count, then the BIOS SMI handler 140 can communicate with the processor core 110 to disable SMI from that machine check bank number. Thus, the BIOS SMI handler 140 can prevent a SMI storm from a particular bank of the machine check bank registers 120 from consuming too much processing time of the CPU 102. In an embodiment, the BIOS SMI handler 140 can communicate with the processor core 110 to disable the particular bank. The other banks in the machine check bank registers 120 can continue to provide SMI based on any detected errors after the particular bank is disabled. In an embodiment, the queue data structure within the system memory 118 can be a fixed size, such that the storage requirements for the queue do not need to be changed as a number of processor cores or machine check banks increases. Instead, the removal of all CPER entries outside the desired time window can be removed to allow the queue enough storage for new CPER entries. In another embodiment, the BIOS SMI handler 140 may operationally trigger a CMCI, and pass control to an OS CMCI handler of the OS to further operations, such as windows event logging. In this situation, the handler 142 can report the corrected error to the computer user.

Figure 2:
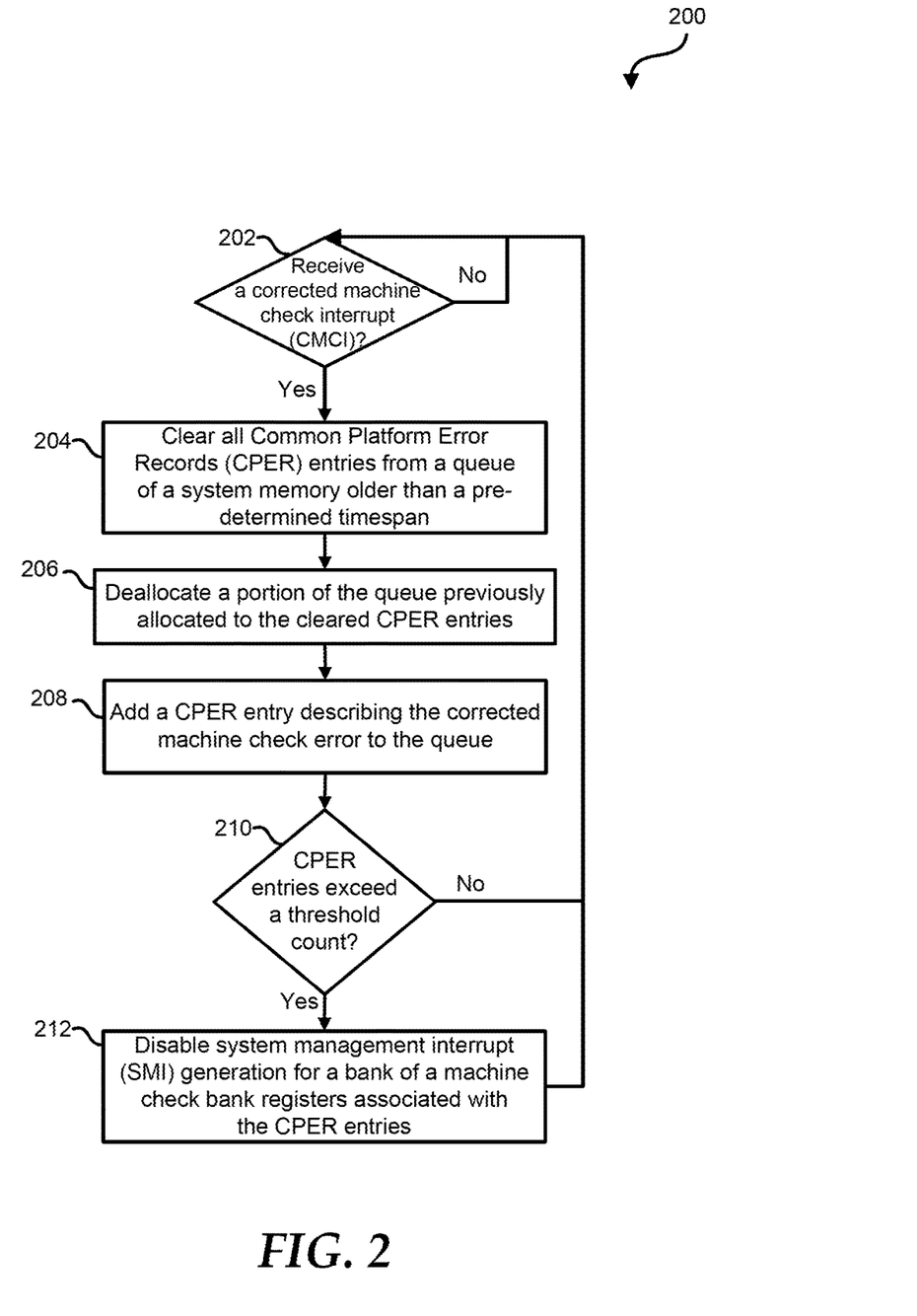
FIG. 2 is a flow diagram of a method for correlating corrected machine check error storm events to specific machine check banks according to at least one embodiment of the present disclosure.

FIG. 2 illustrates a method 200 for correlating corrected machine check error storm events to specific machine check banks according to at least one embodiment of the present disclosure. At block 202, a determination is made whether a CMCI is received. In an embodiment, the CMCI can include an APIC ID and machine check bank number for the source of the corrected error. In an embodiment, the CMCI can cause a SMI to be provided to a SMI handler of the information handling system. In an embodiment, the SMI can be generated based on a detected hardware error in an information handling system. When the CMCI is received, a queue within a system memory is cleared of all CPER entries that are older than a specific timespan at block 204. In an embodiment, the timespan can be ten seconds prior to the when the CMCI was received. At block 206, a portion of the system memory previously allocated to the cleared CPER entry or entries is deallocated for later storage.

At block 208, a CPER entry for the APIC ID and machine check bank number associated with the CMCI is added to the queue of the system memory. In an embodiment, the CPER entry is added by dynamically allocating a required amount of the system memory to the queue. At block 210, a determination is made whether a number of errors that have occurred on a specific APIC ID and machine check bank number has exceeded a threshold count. In an embodiment, this determination can be made based on a number of CPER entries for that APIC ID and machine check bank number within the queue. If the number of CPER entries for that APIC ID and machine check bank number does not exceed the threshold count, the flow continues as stated above at block 202. If the number of CPER entries for that APIC ID and machine check bank number does exceed the threshold count, then SMI generation from that machine check bank number is disabled at block 212, and the flow continues as stated above at block 202.

Figure 3:
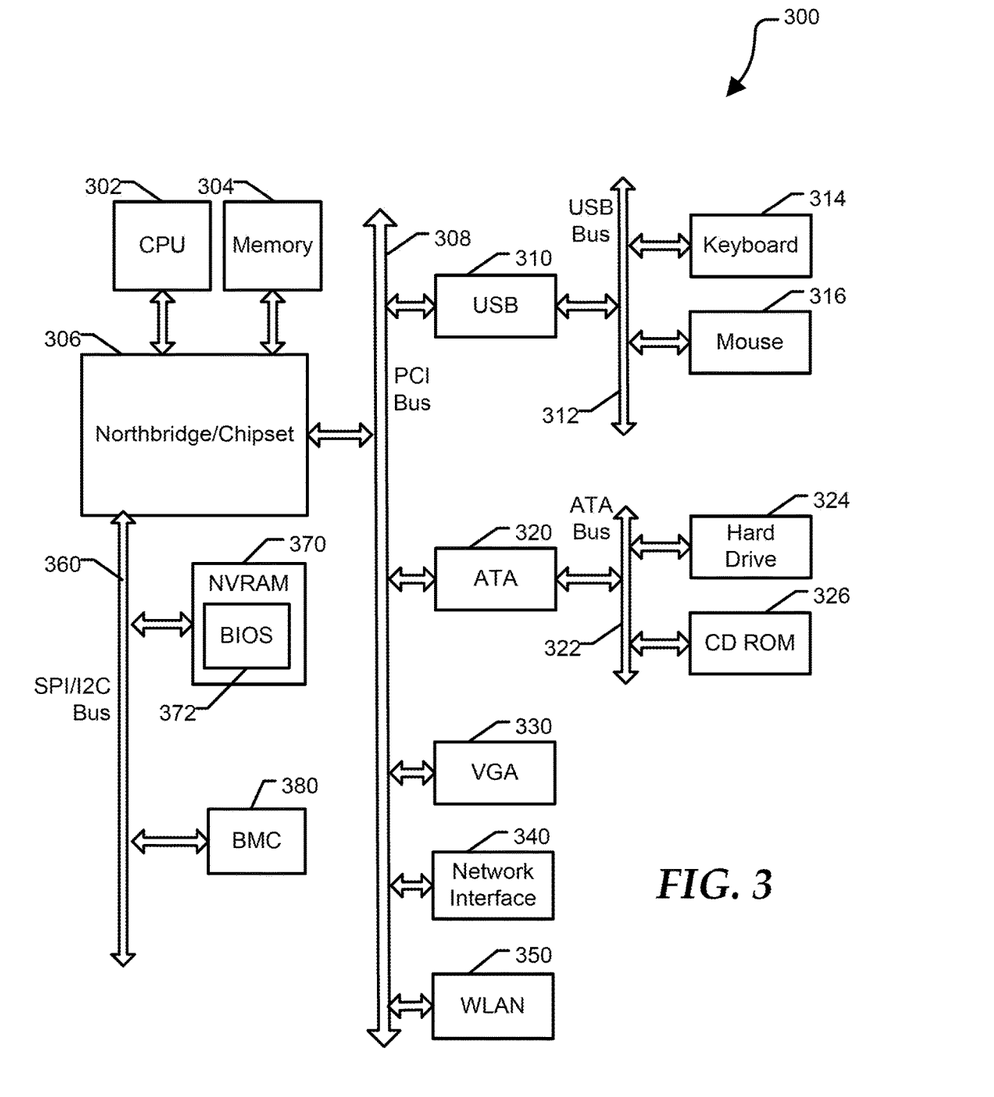
FIG. 3 is a block diagram of a general information handling system according to an embodiment of the present disclosure.

FIG. 3 illustrates a general information handling system 300 including a processor 302, a memory 304, a northbridge/chipset 306, a PCI bus 308, a universal serial bus (USB) controller 310, a USB 312, a keyboard device controller 314, a mouse device controller 316, a configuration an ATA bus controller 320, an ATA bus 322, a hard drive device controller 324, a compact disk read only memory (CD ROM) device controller 326, a video graphics array (VGA) device controller 330, a network interface controller (NIC) 340, a wireless local area network (WLAN) controller 350, a serial peripheral interface (SPI) bus 360, a NVRAM 370 for storing BIOS 372, and a baseboard management controller (BMC) 380. BMC 380 can be referred to as a service processor or embedded controller (EC). Capabilities and functions provided by BMC 380 can vary considerably based on the type of information handling system. For example, the term baseboard management system is often used to describe an embedded processor included at a server, while an embedded controller is more likely to be found in a consumer-level device. As disclosed herein, BMC 380 represents a processing device different from CPU 302, which provides various management functions for information handling system 300. For example, an embedded controller may be responsible for power management, cooling management, and the like. An embedded controller included at a data storage system can be referred to as a storage enclosure processor.

For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 300 can include processing resources for executing machine-executable code, such as CPU 302, a programmable logic array (PLA), an embedded device such as a System-on-a-Chip (SoC), or other control logic hardware. Information handling system 300 can also include one or more computer-readable medium for storing machine-executable code, such as software or data.

System 300 can include additional processors that are configured to provide localized or specific control functions, such as a battery management controller. Bus 360 can include one or more busses, including a SPI bus, an I2C bus, a system management bus (SMBUS), a power management bus (PMBUS), and the like. BMC 380 can be configured to provide out-of-band access to devices at information handling system 300. As used herein, out-of-band access herein refers to operations performed prior to execution of BIOS 372 by processor 302 to initialize operation of system 300.

BIOS 372 can be referred to as a firmware image, and the term BIOS is herein used interchangeably with the term firmware image, or simply firmware. BIOS 372 includes instructions executable by CPU 302 to initialize and test the hardware components of system 300, and to load a boot loader or an operating system (OS) from a mass storage device. BIOS 372 additionally provides an abstraction layer for the hardware, such as a consistent way for application programs and operating systems to interact with the keyboard, display, and other input/output devices. When power is first applied to information handling system 300, the system begins a sequence of initialization procedures. During the initialization sequence, also referred to as a boot sequence, components of system 300 are configured and enabled for operation, and device drivers can be installed. Device drivers provide an interface through which other components of the system 300 can communicate with a corresponding device.

Information handling system 300 can include additional components and additional busses, not shown for clarity. For example, system 300 can include multiple processor cores, audio devices, and the like. While a particular arrangement of bus technologies and interconnections is illustrated for the purpose of example, one of skill will appreciate that the techniques disclosed herein are applicable to other system architectures. System 300 can include multiple CPUs and redundant bus controllers. One or more components can be integrated together. For example, portions of northbridge/chipset 306 can be integrated within CPU 302. Additional components of information handling system 300 can include one or more storage devices that can store machine-executable code, one or more communications ports for communicating with external devices, and various input and output (I/O) devices, such as a keyboard, a mouse, and a video display. An example of information handling system 300 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 300 can include a set of instructions that can be executed to cause the information handling system to perform any one or more of the methods or computer based functions disclosed herein. The information handling system 300 may operate as a standalone device or may be connected to other computer systems or peripheral devices, such as by a network.

In a networked deployment, the information handling system 300 may operate in the capacity of a server or as a client user computer in a server-client user network environment, or as a peer computer system in a peer-to-peer (or distributed) network environment. The information handling system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single information handling system 300 is illustrated, the term "system" shall also be taken to include any collection of systems or sub-systems that individually or jointly execute a set, or multiple sets, of instructions to perform one or more computer functions.

The information handling system 300 can include a disk drive unit and may include a computer-readable medium, not shown in FIG. 3, in which one or more sets of instructions, such as software, can be embedded. Further, the instructions may embody one or more of the methods or logic as described herein. In a particular embodiment, the instructions may reside completely, or at least partially, within system memory 304 or another memory included at system 300, and/or within the processor 302 during execution by the information handling system 300. The system memory 304 and the processor 302 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a central processing unit to execute a basic input/output system management interrupt handler, the central processing unit including:
      a system memory to store Common Platform Error Record entries in a queue of the system memory; and
      a first processor core to detect a hardware error, to store the hardware error in a bank of a machine check bank register of the first processor core, and to generate a system management interrupt in response to storing the hardware error in the bank; and the central processing unit to receive the generated system management interrupt, to clear Common Platform Error Record entries within the queue of the system memory that are outside a specific timespan before a corrected machine check error indication associated with the generated system management interrupt is received, to add a Common Platform Error Record entry associated with the corrected machine check error indication to the queue of the system memory, to determine whether a number of Common Platform Error Record entries for a specific Advanced Processor Interrupt Controller Identification and a machine check bank number of the first processor core has exceeded a threshold count, and to disable system management interrupt generation from the machine check bank number in response to the number of Common Platform Error Record entries exceeding the threshold count.

2. The information handling system of claim 1, wherein other banks in the machine check bank register of the first processor core continue to issue system management interrupts after the system management interrupt generation is disabled for the machine check bank number.

3. The information handling system of claim 1, the central processing unit to deallocate a portion of the system memory previously allocated to the cleared Common Platform Error Record entries.

4. The information handling system of claim 1, the central processing unit to dynamically allocate a required amount of the system memory to the queue to add the Common Platform Error Record entry to the queue.

5. The information handling system of claim 4, wherein the corrected machine check error indication includes an Advanced Processor Interrupt Controller Identification and a machine check bank number associated with the first processor core and the bank of the machine check bank register.

6. The information handling system of claim 5, wherein the machine check bank number is a source of a system management interrupt that caused the corrected machine check error indication to be generated.

7. The information handling system of claim 1, wherein the central processing unit implements Enhanced Machine Check Architecture Generation 2 to determine the Advanced Processor Interrupt Controller Identification and the machine check bank number associated with the corrected machine check error indication.

8. A method comprising:
receiving, by a processor of an information handling system, a system management interrupt;
clearing, by the processor, Common Platform Error Record entries within a queue of a system memory within the information handling system that are outside a specific timespan;
adding, by the processor, a Common Platform Error Record entry associated with a corrected machine check error indication to the queue of the system memory;
determining, by the processor, whether a number of Common Platform Error Record entries for a specific Advanced Processor Interrupt Controller Identification and a machine check bank number has exceeded a threshold count; and
disabling system management interrupt generation from the machine check bank number in response to the number of Common Platform Error Record entries exceeding the threshold count.

9. The method of claim 8 wherein clearing the Common Platform Error Record entries within the queue comprises:
deallocating a portion of the system memory previously allocated to the cleared Common Platform Error Record entries.

10. The method of claim 8 wherein adding the Common Platform Error Record entry to the queue comprises:
dynamically allocating a required amount of the system memory to the queue.

11. The method of claim 8 wherein the corrected machine check error indication includes an Advanced Processor Interrupt Controller Identification and a machine check bank number associated with the corrected machine check error indication.

12. The method of claim 11 wherein the machine check bank number is a source of a system management interrupt that caused the corrected machine check error indication to be generated.

13. The method of claim 12 further comprising:
generating, by a processor core of the processor, the system management interrupt based on a detected hardware error in the information handling system.

14. The method of claim 8 further comprising:
implementing, by the processor, Enhanced Machine Check Architecture Generation 2 to determine the Advanced Processor Interrupt Controller Identification and the machine check bank number associated with the corrected machine check error indication, wherein the machine check bank number includes a physical address within a dual in-line memory module.

15. A method comprising:
detecting, by a first processor core of a central processing unit, a hardware error;
storing, by the first processor core, the hardware error in a bank of a machine check bank register of the first processor core;
generating, by the first processor core, a system management interrupt in response to storing the hardware error in the bank;
receiving a corrected machine check error indication in response to the system management interrupt;
clearing Common Platform Error Record entries within a queue of a system memory within and information handling system that are outside a specific timespan;
adding a Common Platform Error Record entry associated with the corrected machine check error indication to the queue of the system memory;
determining whether a number of Common Platform Error Record entries for a specific Advanced Processor Interrupt Controller Identification and a machine check bank number has exceeded a threshold count; and
disabling system management interrupt generation from the machine check bank number in response to the number of Common Platform Error Record entries exceeding the threshold count.

16. The method of claim 15 wherein clearing the Common Platform Error Record entries within the queue comprises:
deallocating a portion of the system memory previously allocated to the cleared Common Platform Error Record entries.

17. The method of claim 15 wherein adding the Common Platform Error Record entry to the queue comprises:
dynamically allocating a required amount of the system memory to the queue.

18. The method of claim 15 wherein the corrected machine check error indication includes an Advanced Processor Interrupt Controller Identification and a machine check bank number associated with the first processor core and the bank of the machine check bank register.

19. The method of claim 18 wherein the machine check bank number is a source of the system management interrupt that caused the corrected machine check error indication to be generated.

20. The method of claim 15 further comprising:
   implementing, by the processor, Enhanced Machine Check Architecture Generation 2 to determine the Advanced Processor Interrupt Controller Identification and the machine check bank number associated with the corrected machine check error indication.

* * * * *